Jan. 5, 1965  M. T. SGRICCIA ETAL  3,164,244
SELECTION AND TRANSFER DEVICE FOR CONVEYORS
Filed Nov. 14, 1961  2 Sheets-Sheet 1
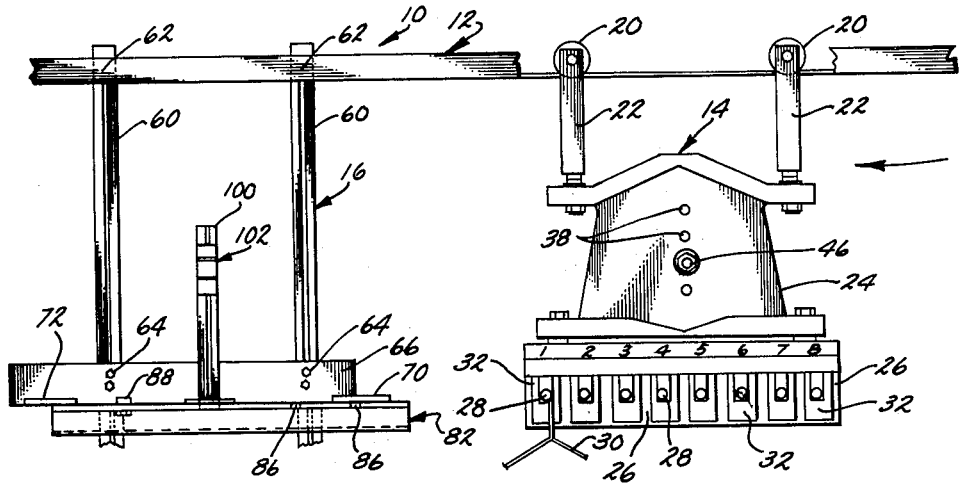
FIG. 1
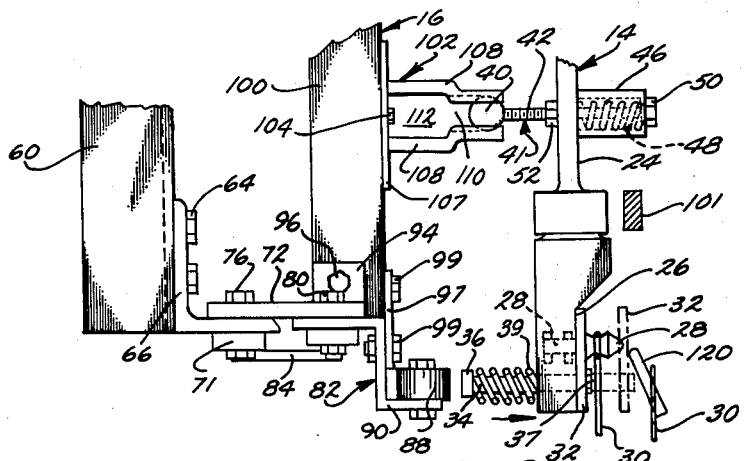
FIG. 2
FIG. 3
INVENTORS
MARIO THOMAS SGRICCIA
THOMAS C. McGOW
BY
ATTORNEYS Jan. 5, 1965    M. T. SGRICCIA ETAL    3,164,244
SELECTION AND TRANSFER DEVICE FOR CONVEYORS
Filed Nov. 14, 1961    2 Sheets-Sheet 2

INVENTORS
MARIO THOMAS SGRICCIA
THOMAS C. McGOW
BY
ATTORNEYS

United States Patent Office 3,164,244
Patented Jan. 5, 1965

3,164,244
SELECTION AND TRANSFER DEVICE FOR CONVEYORS
Mario T. Sgriccia, Detroit, Mich., and Thomas C. McGow, Summit, N.J., assignors to Rapistan-Keystone, Detroit, Mich., a corporation of Michigan
Filed Nov. 14, 1961, Ser. No. 152,202
8 Claims. (Cl. 198—38)

This invention relates to conveyors, and more particularly to a sequencing selection and transfer mechanism for causing a reaction, especially an unloading reaction, with respect to a preselected article on a particular passing carrier.

Automation advances in recent years in the manufacturing, storage, and transportation fields have magnified the serious need in the conveyor art for a relatively inexpensive and completely reliable mechanical selection and unloader mechanism which will also be capable of controlling automatically a number of selective transfer operations.

Users of conveyors desiring selection and transfer devices today must choose between, (1) a simple and limited mechanical selector providing only a few selection possibilities, or (2) a highly complex and very expensive electrical control system with banks of switches or magnetic signaling means and the like. Both of these types are useful for certain applications but obviously possess definite limitations. Further, conventional selectors normally require additional power means such as solenoids to accomplish the transfer operation after the selection step has been performed.

The answer to this problem is a completely mechanical selector and transfer device incorporating simplicity of structure and operation, but which will quickly and inexpensively accomplish selection and transfer operations in complex conveyor systems where a large number of possible selections necessarily exist and are desired. To obtain a practical mechanism for discriminately selecting and releasing an article from a passing carrier capable of supporting a substantial number of articles is a major problem using conventional selection principles and apparatus.

Accordingly, it is an object of this invention, among others, to provide a mechanical selection mechanism for conveyors that overcomes the above-mentioned problems, and possesses the above-mentioned desirable attributes. The inventive mechanism provided is simple in structure and operation, reliable over extended periods of time, relatively inexpensive to produce and operate, and requires little or no maintenance. It is amenable to rapid and simple location and relocation along a conveyor with little modification of conventional conveyor structures. The device is capable of discriminately selecting and unloading an article from a passing carrier or trolley without disturbing other passing carriers and articles. The carriers move past other similar devices for selection of different articles at successive stations as desired. The selector is completely automatic in operation and capable of quick and simple resetting to vary the selection even though it advantageously is entirely mechanical in nature. The selector member of the mechanism can accurately make a predetermined selection from many possible selection choices in a simple manner with a readily adjustable code and code selection means.

It is another object of this invention to provide a selector and unloader which cooperates with a carrier having simple adjustable codes to match the several code selector means of the selector. Within the confines of the broad inventive concept, the carrier is capable of transporting a number of articles to be sequentially and discriminately unloaded by spaced selectors. The action caused by the selector with respect to the articles on the carrier, preferably an unloading action, requires no supplemental power means whatsoever since the selector is capable of simply and effectively transmitting energy from the conveyor or carrier to move and unload the article. If desired, the selector is readily adaptable to operation with a separate power means, to perform any of a number of operations as desired. The selector device transmits energy from the carrier by interlocking with the carrier, and more specifically the code thereof, to create a shifting or swinging motion in the selector device. This motion actuates or sensitizes the article selector which is composed of a plurality of pre-settable elements and causes these elements to act upon the desired articles through their respective supporting means.

A further object is to provide a unique selector mechanism that can discriminately select an article from a supporting carrier having a plurality of article supports or pins, without associating with the other article supports. The selector interacts with only the selected article pin, and then only after the particular carrier supporting the article has been selected itself. Within the broader inventive principle taught, a number of articles can be discriminately selected and removed from particular pins on each carrier, with the carrier being unloaded at successive stations. The limit to the number of articles unloaded depends upon the particular application involved, including the size, configuration, and other physical characteristics of the articles, the conveyor, etc.

These and many other objectives of this invention will be apparent upon studying the following specification in conjunction with the drawings in which:

FIG. 1 is an elevation view illustrating the invention as applied to a trolley-type carrier traveling on an overhead conveyor and approaching a selector mechanism;

FIG. 2 is an enlarged fragmentary end view of the selector mechanism and an approaching carrier;

FIG. 3 is a plan view of the selector mechanism in operation, illustrating the selector in initial position in solid lines and in maximal extended position in phantom;

Figure 4:
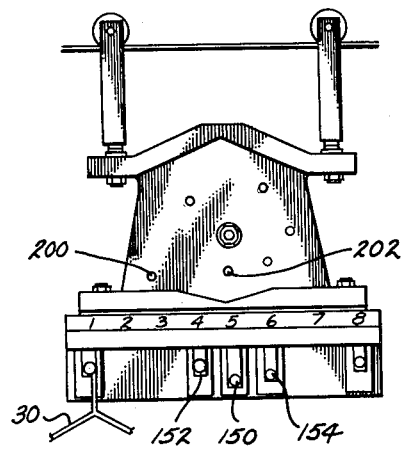
FIG. 4 is an elevation view illustrating a slightly modified carrier.

Basically, the invention comprises a mechanical selector device for a conveyor wherein two interrelated selector means operate sequentially. If the first selection means forms an interengagement or key combination with a preset code on a particular passing carrier, the second selection means then becomes sensitized to interact with respect to at least one selected article and its support means on the carrier. The sensitizing or conditioning of the second selection means preferably occurs by the shifting of a member upon which both selection means are mounted. Each selection means comprises a plurality of adjustable selecting members so that together the two selection means create a number of possible code or selection combinations. After the article selection has been made, the article is acted upon to be unloaded from its respective supporting means on the carrier by the movement of the second selection means with the common member. The article is unloaded with energy transmitted or harnessed from the conveyor or carrier.

Referring to FIG. 1, in the form of the invention therein illustrated, the conveyor apparatus 10 includes a conventional overhead conveyor track 12, a trolley-type carrier 14 movable therealong, and a selector mechanism 16.

The track 12, which may be any of various conventional types, accommodates wheels 20 supporting article carrier 14 by straps 22. A plurality of article suspension means such as pins 28 (FIG. 2) are arranged on the carrier to support articles such as the clothing hangers 30 shown.

The particular form of the invention depicted is especially adaptable to the clothing industry and is explained with respect thereto. The inventive concept, however, can be adapted to countless industries and businesses as is obvious. Although eight such supporting pins are shown, the number may be varied widely at will. A pin-wiping unloader 32 supported on a reciprocable sliding rod 34 by a nut 37 straddles each pin. A separate compression spring 39 biases each wiper 32 individually against face 26 of the carrier so that bumper 36 attached to each rod 34 is held in extended position (FIG. 2).

The coding means includes a primary or sensitizing code, and a secondary or article selection code. The sensitizing code in face 24 includes a plurality of spaced openings 38, here shown to be four in number and labeled A, B, C, and D. These orifices 38 are adapted to accommodate the code pin or projection 41 shown in FIG. 2. Each projection preferably includes a ball 40 mounted on stud 42 which extends through the carrier and is secured by lock nut 52 on one side, and by sleeve 46, spring 48 and nut 50 on the other side.

This presettable coding means cooperates with a plurality of selector mechanisms 16 (FIG. 1) spaced along the conveyor. Each selector mechanism is mounted on suitable vertical supports 60 which may be attached to the overhead track 12 at 62 and/or to the floor on their lower ends as desired. Attached to these supports by bolts 64 is the vertical flange of right-angle member 66. To the horizontal flange of this member is pivotally secured a pair of legs or links 70 and 72 and a parallel, spaced bar or leg 82 so that member 66 actually comprises one of four legs forming a parallelogram or pantograph type apparatus or i.e. a four-bar linkage according to conventional terminology in the form of the invention illustrated. In the structure illustrated leg 82 is a Z-bar with an upper and a lower horizontal flange, the upper one being secured to the links 70 and 72. The selector bar or leg 82 is longitudinally and laterally movable with respect to fixed leg 66 by virtue of pivotal linkages at 74, 76, 78 and 80. Bearing spacers 71 at the pivotal points assure smooth movement. A tension spring 84 attached between points 74 and 80 biases the selector member or pantograph resembling four-bar linkage into the retracted position shown in solid lines in FIG. 3.

The detector or selector member 82 has a plurality of openings or orifices 86 along its outer edge for attachment of one or more biasing cams 88. These cams comprise the chief components of the secondary or article selection code. Each cam must be in the same plane as a bumper 36 on a passing carrier with which it is to react. The cams are thus shown mounted on lower flange 90 of the Z-bar 82. Obviously, the structure may be modified in various ways to accomplish this corresponding relationship between the cams and bumpers.

Figure 5:
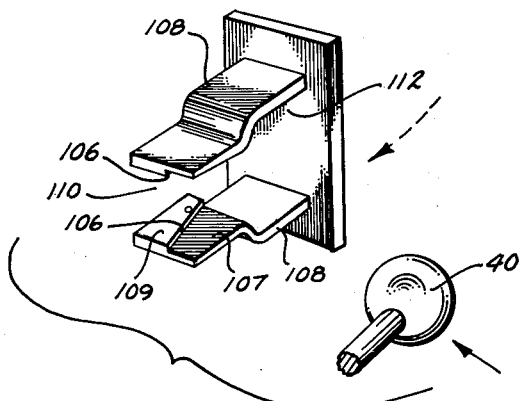
FIG. 5 is a fragmentary perspective view of the interlocking elements of the carrier and selector.

Extending upwardly from selector bar or member 82 and mounted thereto by lateral angle plates 94 including bolts 96, and a front bracer plate 97 secured by bolts 99, is the detection or carrier selection means for association with the sensitizing code projections in orifices 38 of the passing carriers. This selection means includes vertical mounting member 100 to which is adjustably secured by bolts 104 a code or ball-trap 102. This ball-trap includes a pair of cooperating, horizontally-extending arms or segments 108 mounted to plate 107. These facing ball-trap segments are positioned close together to form a trap portion 110 between their outer closer ends thereof, and an escape opening 112 between their inner ends for ball 40 (FIG. 5). A passing ball on a code projection thus can become trapped only in a ball-trap located on the same vertical level, to thereby shift selector member laterally outwardly and longitudinally of the conveyor. Facing, slanted surfaces 106, formed by cutting away portions of arms 108, guide the ball as the trap moves outwardly. The spacing of the outer ends of the arms allows the ball to fit between the first portions 107 of the arms, but not the following portions 109. When the ball and opening 112 coincide, the ball can emerge from the ball-trap to allow the entire selector member, ball-trap included, to return to the original retracted position under the bias of tension spring 84.

It will be obvious that the preferred ball may be substituted by other configurated elements such as a cylindrical roller having a vertical axis, for example. Also, the ball-trap may be formed with only one arm arranged at the desired angle, instead of the two shown. What is important is the principle of operation wherein the code projection interlocks with a receiving member to transmit energy from the passing carrier to the four-bar linkage to thereby shift it outwardly (laterally) and forwardly (longitudinally), after which the code projection is released or freed from the receiver or trap to allow its return. If desired the projections may be mounted on the selector, and the receiving members on the carriers.

It should also be noted that in the broadest concept of the invention the shifting leg 82 need not form part of a four-bar linkage but may, for example, have two downwardly extending pins riding in a pair of arcuate slots in a fixed mounting plate to give a similar movement. Further, leg 82 may possess vertically spaced cams to bump articles at various heights instead of or in addition to the horizontally spaced cams 88. The words "vertical" and "horizontal" as used herein to describe the illustrated form of the invention are therefore descriptive rather than limiting in nature. The important operating principle of shifting leg 82 is its combined lateral and longitudinal movement to thus react upon the carrier and its articles by virtue of being acted upon by the carrier in the first place. This reciprocal sequence is unique in minimizing equipment, space consumption and the like. It is entirely conceivable that modified shifting patterns will accomplish this same purpose.

*Operation*

In using the selector mechanism and carrier in a clothing establishment, as just one example, clothing articles are placed on hangers 30 supported on pins 28. These articles can be of varied styles and sizes to be unloaded selectively at a plurality of unloading stations along the conveyor. By station is meant any work station, storage rack, slick rail or the like. The desired code projection with ball is mounted in a preselected opening (A through D) in face 24 of the carrier for interengagement with a ball-trap at a station at which a pin is to be unloaded. Selector mechanisms with corresponding ball-trap 108 are mounted at the proper height at the selected stations along the conveyor. On each selector member at stations to receive articles, a cam 88 is mounted in an orifice 86 to discriminately discharge an article from a position (1 through 8) on the carrier.

As the carrier moves along the track, the code ball 40 will catch in a corresponding ball-trap 108 of the same height and form an interengagement to interlock therewith and swing or shift the selector member which is the shiftable outer bar parallel to the fixed support bar, both longitudinally and laterally on its pivot points against the bias of spring 84. The energy to shift the selector member is transmitted from a powered-type conveyor through the carrier or from the carrier itself on gravity-type conveyors. As the selector member 82 is shifted outwardly toward the carrier to its extended position (depicted in phantom in FIG. 3), cam 88 attached to the member 82 swings outwardly to abut and depress the selected bumper 36 against the bias of spring 39. Shaft 34 pushes wiping unloader 32 into an extended position (depicted in phantom in FIG. 2) to wipe the hanger 30 from pin 28. The hanger may slide down a suitable adjacent slick rail 120 to a work station or the like, as desired. After this wiping action has been completed, ball 40 reaches the escape opening 112 in the ball-trap (FIG. 3), permitting the whole selector assembly including the ball-trap and member 82 to return to the original retracted position. A suitable stop element 101 prevents the carrier from swinging outwardly when cam 88 pushes rod 34 against spring 39. Since the apparatus has been explained as used in the garment industry, the unloading of only one article from the carrier or trolley has been explained due to practical limitations in handling wide garment hangers. It is entirely conceivable, however, that when conveying long narrow articles, for example, several articles could be placed on the horizontally positioned article pins of each carrier. By proper positioning the cams 88 on successive selectors along the conveyor, articles could be successively unloaded therealong.

It is to be understood that the carrier in the form shown will be trapped by each selector having a ball-trap corresponding to the particular ball. For example, if it is desired to unload narrow articles from pins 1, 3, and 7 at one station, and pins 2, 4, and 8 at a second station, a code ball may be mounted in opening A, and cams 88 are mounted at the first stationary selector mechanism (16) at positions 1, 3, and 7 and at the second selector at positions 2, 4, and 8. Ball traps at the two selectors are positioned to trap the ball at A. Thus, the first selector traps the ball and swings cams out to unload pins 1, 3, and 7; then the second selector traps the ball and swings cams out to unload pins 2, 4, and 8. Normally, it is desirable from a practical point of view to place only one ball on each carrier since the carrier is then trapped only by selectors having a trap corresponding to that one ball. However, it is conceivable that it may be desired in certain uses of the inventive concept to use more than one ball or equivalent code element on a carrier. It should be further noted that the secondary (article) selection means remains completely inactive until the primary (carrier or sensitizer) selection means interlocks with a particular carrier. With the formation of the interlock, the secondary code is conditioned or sensitized to react with only preselected articles. Thus, even though the selectors are capable of choosing a multiple of individual articles, still the operation is quickly performed by virtue of this limited association of the selectors with only the concerned carriers and articles.

*Modifications*

In the broadest scope of this invention, more than eight supports and unloaders may be used. Also, the four code receiving orifices may be increased in number. Further, the ball receiving openings in face 24 may be positioned in a planar pattern rather than a lineal arrangement. By so doing, a first carrier may have a ball at 200 to thus cause a cam on a selector to unload pin 2, while the same cam could unload pin 6 on another carrier having a ball at 202. A single cam thus could function to unload different pins since a code projection secured in orifice 202 would swing the selector member after the carrier had proceeded further along the conveyor than would a code projection in the orifice 200.

Moreover, the article supports presently numbered 1 through 8 could be vertically staggered on face 26 as at 150, 152, and 154. Then cooperating cams on sequential or the same carrier could be vertically spaced to cooperate therewith. The resulting possible combinations are practically unlimited. Yet the mechanism would still be simple in structure and operation and would occupy relatively little space adjacent a conveyor.

Possible operations that may be performed by the selector device are many and varied including unloading, shifting, counting, actuation of sequencing apparatus and many others. The unique mechanism may moreover be applied to many types of conveyors, including gravity, power feed, overhead, belt, chain and others. Of course, the structure illustrated may have to be modified in various ways to fit the particular conveyor but such is well within the skill of those familiar with the art. The adjustable selector mechanism may be mounted in practically any position with equal effectiveness. Its simplicity allows its attachment in a simple and speedy manner. The many obvious modifications and variations possible are deemed part of this invention, which is to be limited only by the scope of the appended claims and the equivalent structures to those defined therein.

We claim:
1. A selector mechanism for a conveyor comprising: a first preset sensitizing selection means mounted adjacent said conveyor and associating with preset codes on passing code-bearing carriers and forming an interengagment with a predetermined preset code to select a predetermined carrier; a plurality of article supporting means on each of said carriers and a second preset selection means sensitized by said interengagement of said first selection means to select predetermined articles on said article supporting means of said selected carrier, and cause a function to be performed with respect thereto.

2. A selector mechanism for a conveyor comprising, a selector member fixedly mountable with respect to said conveyor; a preset sensitizing selection means on said member associating with preset codes on passing carriers and forming an interengagement with a predetermined code; a plurality of article supporting means on each of said carriers; a preset article selection means on said member forming an interaction with at least one article supporting means on a selected passing carrier when sensitized; and said first and second selection means being inter-associated to cause sensitization of said article selection means only when said interengagement of said first selection means occurs, to cause a function to be performed with respect to said article supporting means.

3. A combination carrier and selector mechanism for a conveyor comprising: a plurality of carriers movable along said conveyor; a preset code bearing means on each of said carriers; a plurality of like, adjacent article supporting means on each carrier; a selector member fixedly mountable with respect to said conveyor; a preset primary selection means on said selector member capable of cooperating with said code bearing means and responsive to a predetermined code; a preset secondary selection means on said selector member cooperable with predetermined ones of said article supporting means when reactive; said primary and secondary selector means being inter-associated to cause a reaction between said second selector means and said predetermined ones of said article supporting means only when said first selection means responds to said predetermined code, to cause a function to be performed with respect to said article supporting means.

4. A selector mechanism for a conveyor to select at least one article from a passing carrier, comprising: a plurality of carriers on said conveyor, each having a preset code means and a plurality of article supporting means; a selector member fixedly mountable with respect to said conveyor; said member having a first preset code selection means associating with preset codes on passing carriers and forming a temporary interlock with a predetermined code to thus select a predetermined carrier; a second preset selection means on said selector member; said second selection means being conditioned by the formation of said interlock between said first selector means and said predetermined code of a predetermined carrier; said second selector means being shifted with said conditioning, into reaction with selected ones of said article supporting means thereby, selecting at least one article from said selected carrier, to cause a function to be performed with respect to said article.

5. A selection mechanism for an article carrier on a conveyor comprising: a movable detection member mountable with respect to said conveyor; a presettable mechanical selection means extending from said member; said selection means forming an interlock with a predetermined preset projection code on a passing carrier;

a plurality of article supports on said carrier; a second preset mechanical selection and reaction means associated with said member; said second means being shifted into active position upon the formation of said interlock to react selectively with predetermined articles on said article supports.

6. A selector and unloader mechanism for a conveyor comprising: a plurality of carriers on said conveyor, each having a plurality of article supporting means and presettable code means; a selector member fixedly mountable with respect to said conveyor; a preset carrier selection means on said member cooperable wtih certain presettable code means on a predetermined carrier, and selecting a predetermined passing carrier supporting at least one article thereon, and interengaging therewith; said member being laterally and longitudinally shiftable by said carrier upon the formation of said interlock; and preset article selection and unloading means on said member activated by said shifting to interact with selected article support means and select articles on said predetermined carrier and transfer them with respect to the carrier.

7. A selector and unloader mechanism for a conveyor comprising: a plurality of carriers on said conveyor, each having a plurality of article support means and presettable code means; a selector member fixedly mountable with respect to said conveyor; a preset carrier selection means on said member associating with projecting preset code messages on passing carriers bearing at least one article on said plurality of article support means, and selecting and forming an interengagement with a predetermined code on a predetermined carrier; said member being laterally and longitudinally shifted by said passing carrier upon the formation of said interengagement; a plurality of preset article selection and camming means on said member; a plurality of unloader elements on said carrier associated with said article supporting means; selected ones of said elements being actuated by said camming means with the shifting of said member to select and unload selected articles from said carrier.

8. A selection and unloader mechanism for a conveyor comprising: a plurality of carriers on said conveyor, each having a plurality of article supporting means and presettable code means; a four-bar linkage; one leg of said four-bar linkage being fixedly mountable with respect to said conveyor; a second leg opposite said mountable leg comprising a selector member; a preset carrier selection means on said member associating with projecting preset code messages on passing carriers, and selecting and forming an interengagement with a predetermined code on a predetermined carrier; said member being laterally and longitudinally shifted by said passing carrier upon the formation of said interengagement; preset article selection and camming means on said member; a plurality of unloader elements on said carrier associated with said article supporting means; selected ones of said elements being shifted by said camming means with the shifting of said member to select and unload selected articles from said carrier.

References Cited in the file of this patent
UNITED STATES PATENTS

| | | |
|---|---|---|
| 1,554,765 | Shaffer | Sept. 22, 1925 |
| 1,556,723 | Shaffer | Oct. 13, 1925 |